(12) United States Patent
Morii (10) Patent No.: US 11,397,073 B2
(45) Date of Patent: Jul. 26, 2022

(54) DISPLACEMENT DETECTOR, SURFACE SHAPE MEASURING APPARATUS, AND ROUNDNESS MEASURING APPARATUS

(71) Applicant: Tokyo Seimitsu Co., Ltd., Tokyo (JP)

(72) Inventor: Hideki Morii, Tsuchiura (JP)

(73) Assignee: TOKYO SEIMITSU CO., LTD., Tokyo (JP)

(*) Notice: Subject to any disclaimer, the term of this patent is extended or adjusted under 35 U.S.C. 154(b) by 0 days.

(21) Appl. No.: 17/336,794

(22) Filed: Jun. 2, 2021

(65) Prior Publication Data
US 2021/0285751 A1  Sep. 16, 2021

Related U.S. Application Data
(63) Continuation of application No. PCT/JP2020/015305, filed on Apr. 3, 2020.

(30) Foreign Application Priority Data

Apr. 16, 2019  (JP) .............................. JP2019-077810

(51) Int. Cl.
  *G01B 5/016* (2006.01)
  *G01B 21/04* (2006.01)
(52) U.S. Cl.
  CPC ........... *G01B 5/016* (2013.01); *G01B 21/045* (2013.01)
(58) Field of Classification Search
  CPC ............................... G01B 5/016; G01B 21/045
  See application file for complete search history.

(56) References Cited

U.S. PATENT DOCUMENTS 4,455,755 A * 6/1984 Fritsche ................. G01B 3/008
  33/504
4,532,715 A * 8/1985 Sterki .................... G01B 7/283
  33/501.9
(Continued)

FOREIGN PATENT DOCUMENTS

CN  102749058 A  10/2012
CN  105444651 A   3/2016
(Continued)

OTHER PUBLICATIONS

Decision to Grant a Patent in JP 2019-077810 dated Sep. 29, 2020.
(Continued)

*Primary Examiner* — Nimeshkumar D Patel
*Assistant Examiner* — Tania Courson
(74) *Attorney, Agent, or Firm* — Birch, Stewart, Kolasch & Birch, LLP (57) ABSTRACT

Provided are a displacement detector, a surface shape measuring apparatus, and a roundness measuring apparatus capable of measuring displacement in a plurality of directions, having a simple configuration, and capable of highly accurate measurement. A displacement measurer includes: a detector body; a substantially L-shaped stylus having a contactor to be in contact with a measuring surface of an object to be measured; a stylus holding part that is provided in the detector body and holds the stylus in a swingable manner, with a swing plane being a plane including a first direction and a second direction that are perpendicular to each other; and a displacement detecting unit that is provided in the detector body and detects displacement of the contactor associated with contact between the contactor and the measuring surface.

18 Claims, 9 Drawing Sheets

(56) References Cited

U.S. PATENT DOCUMENTS

| | | | | | |
|---|---|---|---|---|---|
| 4,852,402 | A | * | 8/1989 | Bertz | G01B 5/202 |
| | | | | | 73/162 |
| 5,309,646 | A | * | 5/1994 | Randolph, Jr. | G05B 19/402 |
| | | | | | 33/502 |
| 5,615,489 | A | * | 4/1997 | Breyer | G01B 5/012 |
| | | | | | 33/503 |
| 5,758,429 | A | * | 6/1998 | Farzan | G01B 5/008 |
| | | | | | 33/1 MP |
| 5,832,416 | A | * | 11/1998 | Anderson | G01B 21/042 |
| | | | | | 702/95 |
| 7,712,355 | B2 | * | 5/2010 | Takanashi | G01B 7/001 |
| | | | | | 73/105 |
| 7,852,031 | B2 | * | 12/2010 | Hon | G05B 19/402 |
| | | | | | 318/572 |
| 8,140,178 | B2 | * | 3/2012 | Hon | G01B 5/20 |
| | | | | | 700/195 |
| 8,160,737 | B2 | * | 4/2012 | Hon | G01B 5/008 |
| | | | | | 700/195 |
| 9,074,865 | B2 | * | 7/2015 | Yamauchi | G01B 21/30 |
| 9,921,049 | B2 | * | 3/2018 | Kanno | G01B 5/0014 |
| 10,663,283 | B2 | * | 5/2020 | Kanno | G01B 5/0004 |
| 10,724,841 | B2 | * | 7/2020 | Morii | G01B 5/012 |
| 11,067,382 | B2 | * | 7/2021 | Kanno | G01B 5/0014 |
| 2008/0249741 | A1 | * | 10/2008 | Hon | G05B 19/401 |
| | | | | | 702/168 |
| 2008/0294369 | A1 | * | 11/2008 | Kojima | G01B 5/201 |
| | | | | | 702/168 |
| 2009/0249867 | A1 | | 10/2009 | Takanashi | |
| 2010/0030368 | A1 | | 2/2010 | Hon et al. | |
| 2011/0167657 | A1 | | 7/2011 | Eaton | |
| 2012/0185210 | A1 | * | 7/2012 | Takanashi | G01B 5/008 |
| | | | | | 702/168 |
| 2012/0227476 | A1 | * | 9/2012 | Nakayama | G01B 21/20 |
| | | | | | 73/105 |
| 2012/0266475 | A1 | | 10/2012 | Nakayama et al. | |
| 2014/0331511 | A1 | | 11/2014 | Yamauchi et al. | |
| 2015/0075020 | A1 | * | 3/2015 | Mori | G01B 5/008 |
| | | | | | 33/556 |
| 2016/0084631 | A1 | | 3/2016 | Nakayama | |
| 2019/0368855 | A1 | | 12/2019 | Morii | |

FOREIGN PATENT DOCUMENTS

| | | | | |
|---|---|---|---|---|
| DE | 11 2018 001 621 B4 | | 6/2021 | |
| JP | 6-273104 A | | 9/1994 | |
| JP | 7-505958 A | | 6/1995 | |
| JP | 2017-156255 A | | 9/2017 | |
| JP | 2018-163093 A | | 10/2018 | |
| JP | 2018-173349 A | | 11/2018 | |
| WO | WO 2007/097135 A1 | | 8/2007 | |
| WO | WO-2020213432 A1 | * | 10/2020 | G01B 5/20 |

OTHER PUBLICATIONS

International Preliminary Report on Patentability for PCT/JP2020/015305 (PCT/IPEA/409) dated Dec. 24, 2020.

International Search Report for PCT/JP2020/015305 dated Jul. 7, 2020.

Notice of Reasons for Refusal in JP 2019-077810 dated Feb. 7, 2020.

Notice of Reasons for Refusal in JP 2019-077810 dated Jun. 26, 2020.

Written Opinion of the International Searching Authority for PCT/JP2020/015305 (PCT/ISA/237) dated Jul. 7, 2020.

Chinese Office Action and Search Report for corresponding Chinese Application No. 202080008208.1, dated Oct. 27, 2021, with English translation.

Chinese Office Action issued in corresponding Chinese Application No. 202080008208.1, dated Mar. 16, 2022, with English translation.

German Office Action for counterpart German Application No. 112020001949.7, dated May 25, 2022, with English translation.

* cited by examiner

DISPLACEMENT DETECTOR, SURFACE SHAPE MEASURING APPARATUS, AND ROUNDNESS MEASURING APPARATUS

CROSS-REFERENCE TO RELATED APPLICATIONS

The present application is a Continuation of PCT International Application No. PCT/JP2020/015305 filed on Apr. 3, 2020 claiming priority under 35 U.S.C § 119(a) to Japanese Patent Application No. 2019-077810 filed on Apr. 16, 2019. Each of the above applications is hereby expressly incorporated by reference, in their entirety, into the present application.

BACKGROUND OF THE INVENTION

1. Field of the Invention

The present invention relates to a displacement detector, in particular to a displacement detector which can detect displacement in two directions.

2. Description of the Related Art

Conventionally, for roundness measurement, flatness measurement, and the like, a displacement detector has been used that detects displacement of a contactor while the contactor and an object to be measured are moved relatively to each other in a state in which the contactor is in contact with the object to be measured. In general, in a case where a displacement detector can perform measurement in only one direction, the attitude of the displacement detector needs to be changed according to the measurement direction.

However, such a change in attitude is cumbersome and deteriorates work efficiency. Thus, as a displacement detector that eliminates the need for the change in attitude, a displacement detector has been proposed heretofore that is capable of measurement in a plurality of directions.

For example, International Publication No. WO2007/09713 (hereinafter referred to as "Patent Literature 1") discloses a displacement detector that is capable of measurement in two directions having only one differential transformer (LVDT: Linear Variable differential Transformer). The displacement detector disclosed in Patent Literature 1 has two contactors. One contactor is connected to a bobbin of the LVDT and used for detecting displacement in the horizontal direction. The other contactor is connected to a core of the LVDT and used for detecting displacement in the perpendicular direction.

CITATION LIST

Patent Literature 1: International Publication No. WO2007/097135

SUMMARY OF THE INVENTION

However, the displacement detector disclosed in Patent Literature 1 has a problem that the attitude of the displacement detector is restricted (that is, degree of freedom of attitude is deteriorated) during measurement, due to its configuration having two contactors. There is also a problem that the displacement detector has complicated configuration. Furthermore, there are still problems to be improved, such as an issue that movement of one contactor is caused by a shaft that connects arms of the two contactors in a case where the other contactor is used for measurement.

The present invention has been made in view of the aforementioned circumstances, and aims to provide a displacement detector that can measure displacement in a plurality of directions with a simple configuration and while improving measurement accuracy.

In order to achieve the aforementioned objective, a displacement detector according to a first aspect of the present invention includes: a detector body; a stylus having a contactor configured to be brought into contact with a measuring surface of an object to be measured; a stylus holding part provided in the detector body and configured to hold the stylus swingably in a swing plane including a first direction and a second direction that are perpendicular to each other; and a displacement detecting unit provided in the detector body and configured to detect displacement of the contactor in association with contact between the contactor and the measuring surface, wherein the stylus includes: a first arm which has a first one end portion and a first another end portion, and extends in the first direction from the first one end portion toward the first another end portion, the first one end portion being held by the stylus holding part; and a second arm which has a second one end portion and a second another end portion and extends in the second direction from the second one end portion toward the second another end portion, the second one end portion being connected to the first another end portion and the second another end portion being provided with the contactor.

In the displacement detector, because the stylus is swingable in the plane including the first direction and the second direction, the contactor is displaceable in two directions of the first direction and the second direction. Therefore, it is possible to measure displacement in two directions with only one displacement detecting unit, and thus, the configuration of the displacement detector can be simplified. Eventually, it is possible to reduce the production cost of the displacement detector. In addition, due to having only one swing center as a moving part, the displacement detector can perform highly accurate measurement through suppression of occurrence of errors caused by the moving part.

Here, it is preferable that the stylus is pivotally supported (journaled) via the stylus holding part to be swingable around a rotational axis perpendicular to the swing plane. In this case, the displacement detector desirably includes a measurement force applying part configured to apply a force biasing the contactor in a direction toward the measuring surface. The measurement force applying part can be exemplified by a spring, a counterweight, and the like.

Alternatively, it is preferable that the stylus holding part is attached to the detector body via an elastic body in a swingable manner. The elastic body can be exemplified by a spring. In this case, the measurement force applying part may be omitted from the displacement detector.

It is preferable that, assuming that a contactor direction is a direction from a swing center of the stylus toward the contactor, the contactor direction includes a component in the first direction and a component in the second direction. It is preferable that, in a state in which the contactor is not in contact with the measuring surface, the component in the first direction and the component in the second direction are each no less than 50% of the entire component in the contactor direction. It is more preferable that, in a state in which the contactor is not in contact with the measuring surface, the component in the first direction and the component in the second direction are each no less than 60% of the entire component in the contactor direction. It is still more preferable that, when the contactor is displaced, the displacement detecting unit is capable of detecting displacement in the first direction and displacement in the second direction as the displacement of the contactor. The component in the first direction and the component in the second direction are set to fall within the appropriate range so that a significant difference in sensitivity can be prevented from occurring depending on the measurement direction.

In addition, it is preferable that, in the displacement detector, the displacement detecting unit has a calibration value for each of the first direction and the second direction. Because the calibration value is set for each of the two measurement directions, the displacement detector is capable of highly accurate measurement in both of the measurement directions.

Furthermore, it is preferable that, in the displacement detector, the displacement detecting unit includes a differential transformer having a core and a plurality of coils, and the stylus holding part supports the core at an end portion on a side opposite to a side on which the stylus is supported, seen from the swing center.

A surface shape measuring apparatus according to a second aspect of the present invention includes the displacement detector according to the first aspect, and a moving mechanism configured to hold the displacement detector and move the displacement detector relatively to the object to be measured in a horizontal direction and a perpendicular direction perpendicular to the horizontal direction. By employing the displacement detector according to the first aspect, the configuration of the surface shape measuring apparatus can be simplified.

It is preferable that the surface shape measuring apparatus according to the second aspect further includes a control unit configured to detect a measurement direction of the displacement detector based on a moving direction of the moving mechanism when the contactor of the displacement detector is brought into contact with the object to be measured at start of measurement. By automatically detecting the measurement direction, efficiency of the measurement can be improved. Here, it is preferable that the control unit detects the moving direction of the displacement detector based on a signal that controls driving of the moving mechanism.

A roundness measuring apparatus according to a third aspect of the present invention includes the displacement detector according to the first aspect and a rotary stage configured to rotate the object to be measured around a stage rotational axis that is parallel to the perpendicular direction. By employing the displacement detector according to the first aspect, the configuration of the roundness measuring apparatus can be simplified.

In addition, it is preferable that the roundness measuring apparatus according to the third aspect further includes: a moving mechanism configured to hold the displacement detector and move the displacement detector relatively to the object to be measured in a horizontal direction and a perpendicular direction perpendicular to the horizontal direction; and a control unit configured to detect a measurement direction of the displacement detector based on a moving direction of the moving mechanism when the contactor of the displacement detector is brought into contact with the object to be measured at start of measurement. By automatically detecting the measurement direction, efficiency of the measurement can be improved. Here, it is preferable that the control unit detects the moving direction of the displacement detector based on a signal that controls driving of the moving mechanism.

According to the present invention, it is possible to provide a displacement detector can highly-accurately measure displacement in a plurality of directions, with a simple configuration.

DESCRIPTION OF THE PREFERRED EMBODIMENTS

Hereinafter, embodiments of the present invention are described with reference to the attached drawings.

First Embodiment

Figure 1:
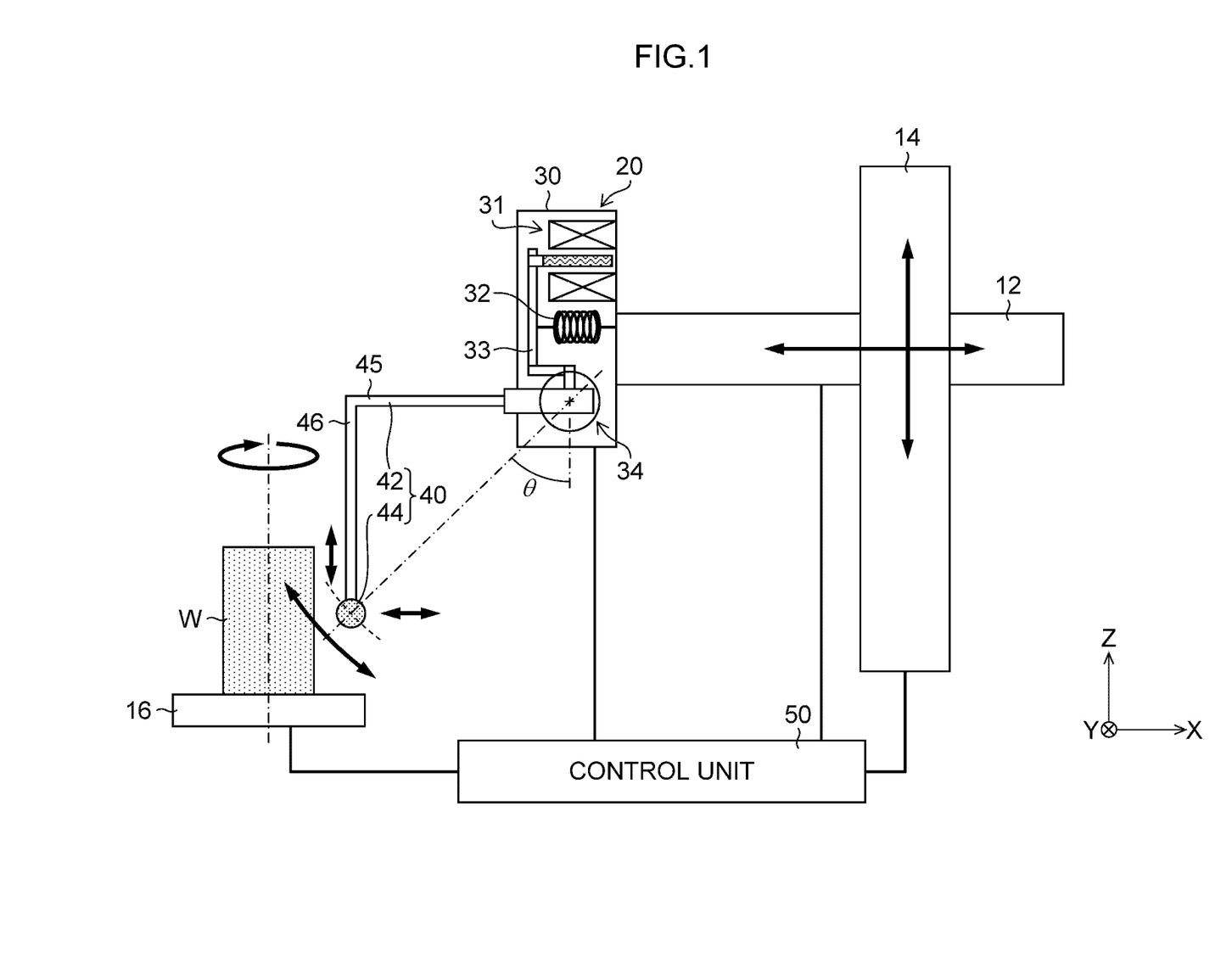
FIG. 1 shows an example of a configuration of a surface shape measuring apparatus (roundness measuring apparatus) according to a first embodiment.

FIG. 1 shows an overall configuration of a surface shape measuring apparatus (roundness measuring apparatus) according to a first embodiment. Note that an X-axis direction, a Y-axis direction, and a Z-axis direction are directions perpendicular to each other, the X-axis direction being the horizontal direction, the Y-axis direction being the horizontal direction perpendicular to the X-axis direction, and the Z-axis direction being the perpendicular direction (up-down direction). As illustrated in FIG. 1, a surface shape measuring apparatus 10 includes a horizontal moving mechanism 12, a perpendicular moving mechanism 14, a rotary table 16, a displacement detector 20, and a control unit 50.

The horizontal moving mechanism 12 is provided to extend in the horizontal direction (X-axis direction in FIG. 1). One end of the horizontal moving mechanism 12 detachably holds the displacement detector 20, while the other end of the horizontal moving mechanism 12 is held by the perpendicular moving mechanism 14. The horizontal moving mechanism 12 is driven by a motor (not illustrated) to move in the horizontal direction.

The perpendicular moving mechanism 14 is provided upright in the perpendicular direction on a body base (not illustrated). The horizontal moving mechanism 12 is driven by a motor (not illustrated) of the perpendicular moving mechanism 14 to move in the perpendicular direction along the perpendicular moving mechanism 14. The position of the displacement detector 20 in the horizontal direction and the perpendicular direction is adjusted through movement of the horizontal moving mechanism 12.

The rotary table (rotary stage) 16 is provided on the body base. It is possible to finely feed the rotary table 16 in the X-axis direction and the Y-axis direction by means of an X-axis direction fine movement knob (not illustrated) and a Y-axis direction fine movement knob (not illustrated). In addition, inclination of the rotary table 16 in the X-axis direction and the Y-axis direction is adjusted by means of an X-axis direction inclination knob (not illustrated) and a Y-axis direction inclination knob (not illustrated). The rotary table 16 is rotated around a rotational axis parallel to the Z-axis direction by means of a motor (not illustrated) provided on the body base.

A workpiece W, which is an object to be measured, is placed on an upper face of the rotary table 16. The rotational axis of the rotary table 16 is parallel to the Z-axis direction. The workpiece W is placed such that a central axis thereof corresponds to the rotational axis of the rotary table 16. The workpiece W placed on the rotary table 16 is rotated together with the rotary table 16 around the rotational axis.

The control unit 50 is provided with a CPU (Central Processing Unit), ROM (Read Only Memory), RAM (Random Access Memory), an input/output interface, and the like that are not illustrated. In the control unit 50, various types of calculation processes and control processes are executed via the input/output interface, in such a way that various types of programs such as a control program stored in the ROM are loaded into the RAM and the programs loaded into the RAM are executed by the CPU.

Although one control unit 50 is shown in FIG. 1, the one control unit 50 may be divided into a plurality of control units according to functions. The position of the control unit 50 may also be selected arbitrarily.

The control unit 50 integrally controls the horizontal moving mechanism 12, the perpendicular moving mechanism 14, the rotary table 16, and the displacement detector 20, according to the various types of programs such as the control program. For example, the control unit 50 drives the horizontal moving mechanism 12, the perpendicular moving mechanism 14, and the rotary table 16, based on a user instruction having been input via the input/output interface (not illustrated). For example, the control unit 50 also calibrates the displacement detector 20. For example, the control unit 50 also detects the measurement direction of the displacement detector 20 based on the driving directions of the horizontal moving mechanism 12 and the perpendicular moving mechanism 14 at the start of measurement. Various types of processes executed by the control unit 50 are described later in detail.

The displacement detector 20 includes a detector body 30 and a stylus 40. The detector body 30 includes a displacement detecting unit 31, a measurement force applying mechanism (measurement force applying part) 32, and a stylus holding part 33. In the present embodiment, an LVDT is explained as an example of the displacement detecting unit 31.

The displacement detecting unit 31 has a core and a bobbin including a plurality of coils. The bobbin is fixed to a fixing part, for example the detector body 30. One end of the core is connected to the stylus holding part 33 while the other end is a free end. The configuration of the LVDT is publicly known, and therefore detailed explanation thereof is omitted herein.

One end of the stylus holding part 33 is connected to the core of the displacement detecting unit 31. The other end of the stylus holding part 33 holds the stylus 40 in a swingable manner (or a rotatable manner). In the first embodiment, the stylus holding part 33 has a bearing 34 at the other end, and holds the stylus 40 to be swingable around the bearing 34 as a rotational axis (swing center). The bearing 34 is exemplified by various types of bearings. In FIG. 1, the stylus 40 is held in a swingable manner (swingably) around a rotational axis parallel to the Y-axis direction.

When the position of a contactor 44 at a leading end of the stylus 40 is displaced during measurement, the displacement is transmitted to the core of the displacement detecting unit 31 via a stylus arm 42 and the stylus holding part 33, and thus the position of the core is displaced. The displacement detecting unit 31 detects a displacement amount and displacement direction of the contactor 44 through detection of a displacement amount and displacement direction of the core.

The measurement force applying mechanism 32 applies a measurement force to the stylus 40, the measurement force acting to press (bias) the contactor 44 against a measuring surface (surface to be measured). The measurement force applying mechanism 32 has, for example, an elastic body. In the present embodiment, a coil spring is explained as an example of the elastic body. The coil spring may be either an extension spring (pull spring) or a compression spring. One end of the coil spring of the measurement force applying mechanism 32 is connected to the stylus holding part 33, while the other end of the coil spring is fixed to a fixing part, for example the detector body 30.

In the present embodiment, the control unit 50 can also automatically detect a direction of measurement (measurement direction) of the displacement by means of the displacement detector 20. The detection of the measurement direction is described later in detail.

The stylus 40 includes the stylus arm 42 and the contactor 44. The stylus arm 42 is, for example, substantially L-shaped, and includes a horizontal arm portion 45 extending in the X-axis direction and a perpendicular arm portion 46 extending in the Z-axis direction. A base end of the horizontal arm portion 45 is held by the stylus holding part 33 of the displacement detector 20, while a leading end of the horizontal arm portion 45 corresponds to a base end of the perpendicular arm portion 46. The perpendicular arm portion 46 extends vertically downward from the leading end of the horizontal arm portion 45, and the contactor 44 is provided at the leading end of the perpendicular arm portion 46.

During measurement, the contactor 44 is in contact with the measuring surface of the workpiece W, and the position of the contactor 44 is displaced according to displacement of the measuring surface. The shape and material of the contactor 44 are not particularly limited, and the shape of the contactor 44 is exemplified by a spherical shape, a semi-spherical shape, a cylindrical shape, a disk shape, an ax shape, a conical shape, a polygonal pyramid shape, and the like. The material of the contactor 44 is exemplified by ruby, zirconia, ceramic, and the like.

In the present embodiment, since the contactor 44 is connected to the displacement detector 20 via the substantially L-shaped stylus arm 42, the position of the contactor 44 is not immediately below the displacement detector 20. A line (line L shown by a dashed dotted line in FIG. 1) connecting a center of the contactor 44 with a center (axis) of swing movement of the stylus 40 (center of the bearing 34) forms an angle (inclination angle of the stylus 40) $\theta$ with respect to the vertical line. The angle $\theta$ is not particularly limited, and it is preferable that the angle $\theta$ is 30° to 60°, it is more preferable that the angle $\theta$ is 38° to 52°, and it is still more preferable that the angle θ is substantially 45°. FIG. 1 shows the case of the angle θ being 45°. The angle θ is described later in detail.

Figure 2:
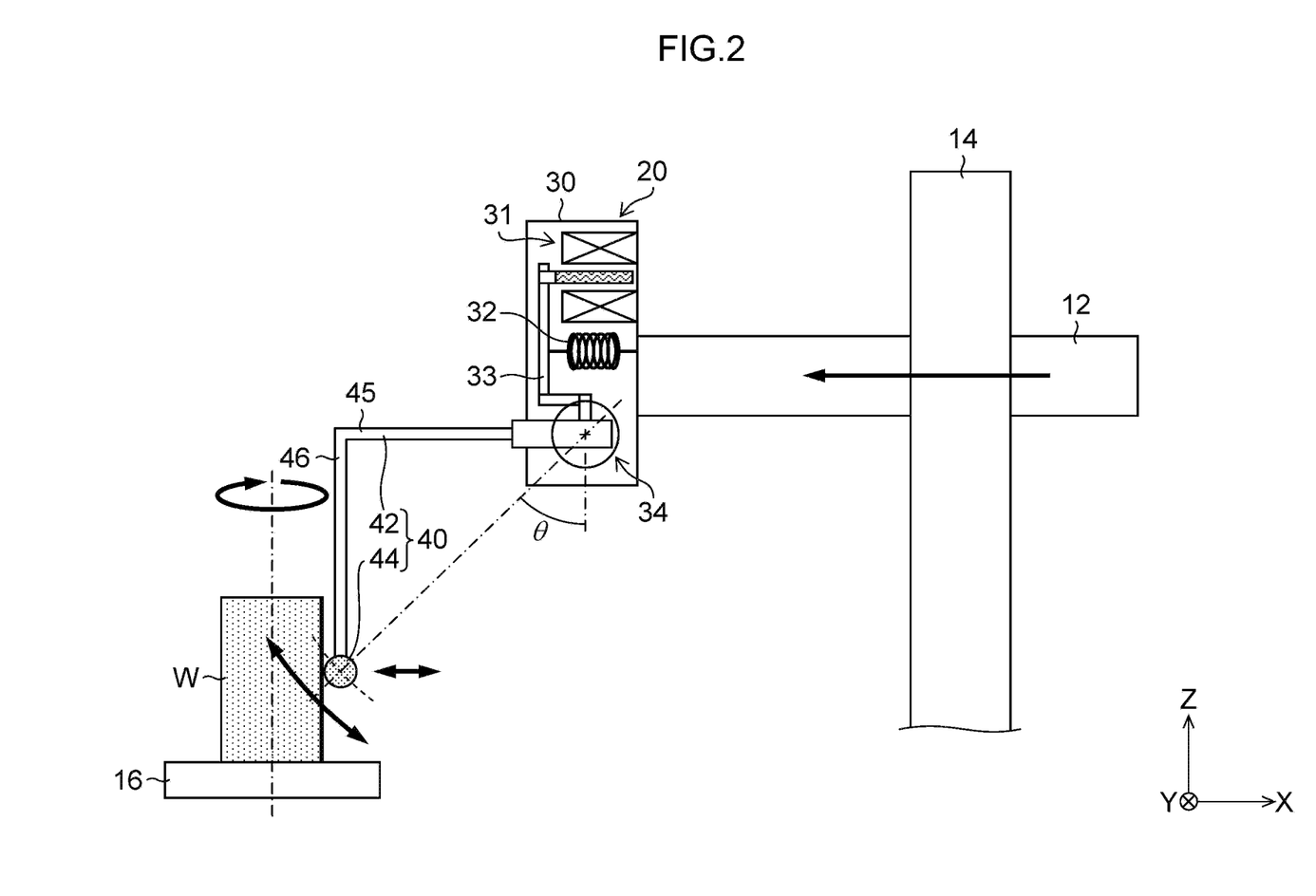
FIG. 2 shows an example of attitude of a displacement detector during measurement of displacement in the horizontal direction.
Figure 3:
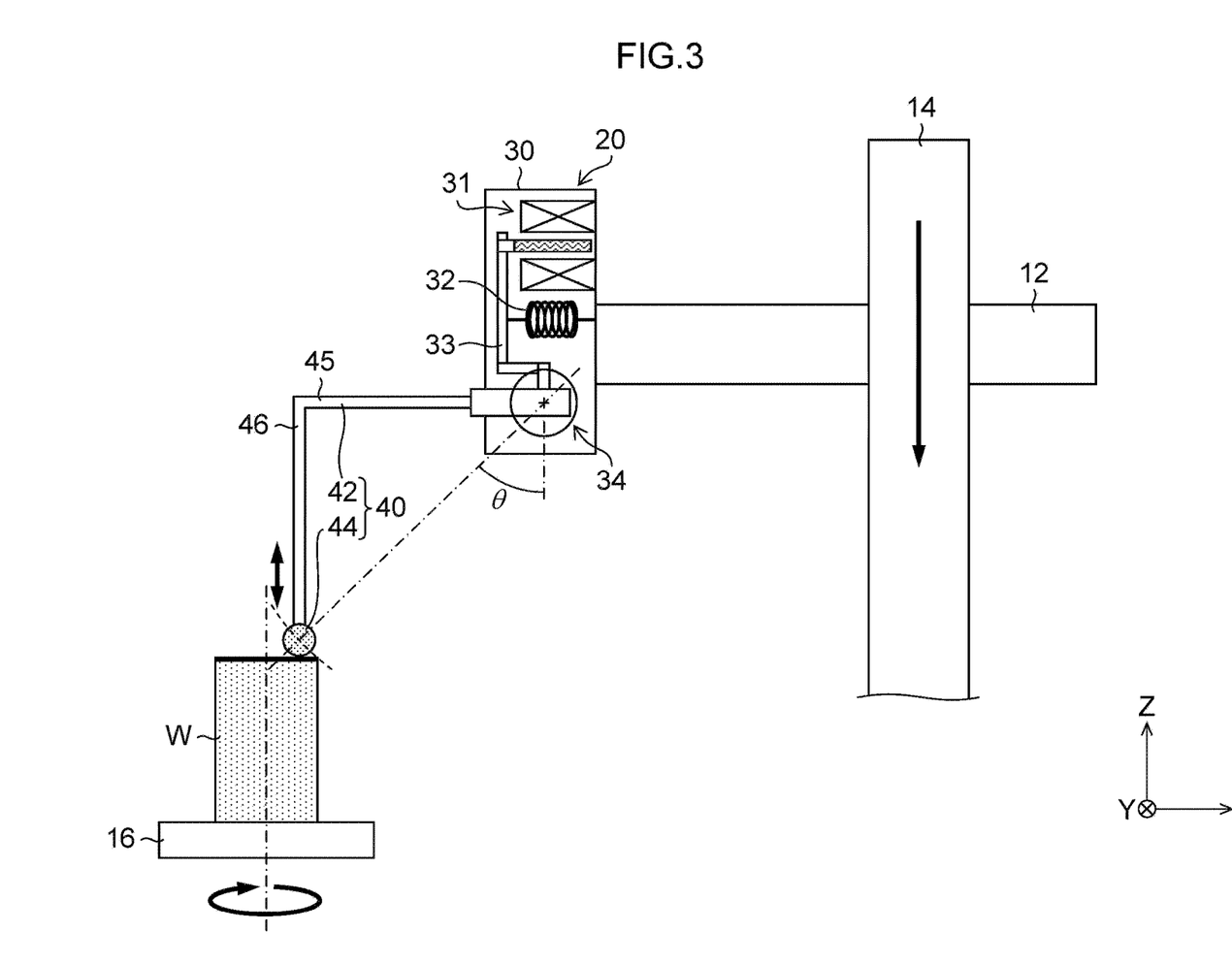
FIG. 3 shows an example of attitude of the displacement detector during measurement of displacement in the perpendicular direction.
Figure 4:
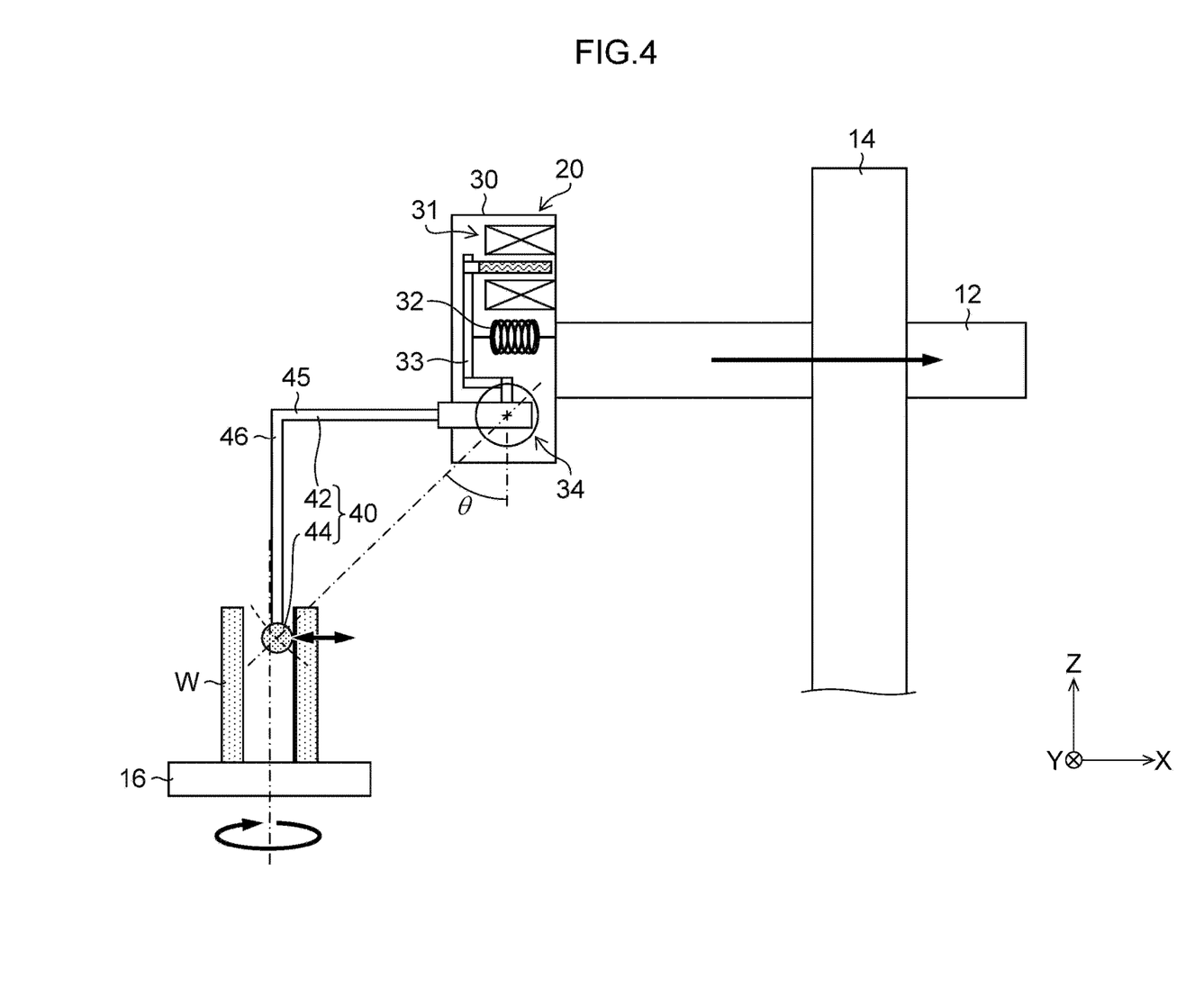
FIG. 4 shows another example of attitude of the displacement detector during measurement of displacement in the horizontal direction.

Hereinafter, the attitude of the displacement detector 20 during measurement of displacement in the horizontal direction (X-axis direction) and the perpendicular direction (Z-axis direction) by using the surface shape measuring apparatus 10 is explained with reference to FIGS. 2 to 4. The workpiece W having a hollow cylindrical shape is described as an example; however, it should not be construed as limiting the shape of the workpiece W. FIGS. 2 to 4 show the attitude of the displacement detector 20 during measurement of: roundness of an outer peripheral lateral face; flatness of a top face; and roundness of an inner peripheral lateral face, respectively.

In the present embodiment, since the stylus arm 42 is swingable around the rotational axis parallel to the Y-axis direction by means of the bearing 34, the contactor 44 swings in the X-Z plane. In other words, the contactor 44 is displaceable in the X-axis direction and the Z-axis direction. Therefore, there is no need for changing the attitude of the displacement detector 20 between the case of measuring displacement in the horizontal direction for measuring roundness of the outer peripheral lateral face of the workpiece W (FIG. 2) and the case of measuring displacement in the horizontal direction for measuring flatness of the top face of the workpiece W (FIG. 3).

Furthermore, in the present embodiment, the shape of the stylus arm 42 is also ingeniously designed in order to reduce the effort of changing the attitude of the displacement detector 20. In other words, since the stylus arm 42 is substantially L-shaped, the contactor 44 is not on the extension line of the detector body 30 in the X-axis direction and the Z-axis direction. Since there is no chance that the detector body 30 interferes with the workpiece W, the attitude of the displacement detector 20 does not need to be changed even in the case of measuring roundness of the inner peripheral lateral face of the workpiece W (FIG. 4). It is thus possible to prevent reduction in work efficiency associated with the change in attitude.

The displacement detector 20 according to the present embodiment employs the stylus 40 which is swingable (rotatable) around the Y-axis direction, and thus the direction of displacement of the contactor 44 detected by the displacement detector 20 is the direction of the tangent (tangential line) to an arc around the rotational axis of the stylus 40. In other words, the displacement of the contactor 44 includes an X-axis direction component and a Z-axis direction component. Given this, the control unit 50 calculates a displacement amount (a displacement amount in the X-axis direction or a displacement amount in the Z-axis direction) corresponding to the measurement direction, based on the displacement amount of the contactor 44 and the angle θ.

Calculation of the displacement amount by the control unit 50 is explained hereinafter. The angle formed between the line (line L shown by a dashed dotted line in FIG. 1) connecting the center of the contactor 44 with the rotational axis of the stylus 40 before the start of the measurement and the vertical line is referred to as θ. During measurement, the contactor 44 swings to draw a small arc. An amount of change in the angle θ (angle change amount) caused by swing of the contactor 44 is referred to as dθ.

The angle change amount dθ is sufficiently small that the displacement, in a small arc shape, of the contactor 44 can approximate a line segment perpendicular to a line connecting the center of the contactor 44 with the rotational axis of swing (i.e., line segment in the direction of the tangent to the arc).

Since a swing radius of the contactor 44 is a known distance between the center of the contactor 44 and the rotational axis of swing, the control unit 50 can resolve the displacement amount of the contactor 44 in the X-Z plane into the displacement amount in the horizontal direction (X-axis direction) and the displacement amount in the perpendicular direction (vertical direction, Z-axis direction) by using a trigonometric function. More specifically, the displacement amount in the X-axis direction can be calculated by D·cos θ, and the displacement amount in the Z-axis direction can be calculated by D·sin θ. Here, D is the length of a line segment in the direction of the tangent to the arc drawn by the swinging movement of the contactor 44.

The control unit 50, in the case of measuring the displacement in the horizontal direction, outputs a result of multiplying the displacement amount of the contactor 44 by cos θ as a measurement result, while in the case of measuring the displacement in the perpendicular direction, outputs a result of multiplying the displacement amount of the contactor 44 by sin θ as a measurement result.

As described above, according to the present embodiment, it is possible to measure the displacement in two directions by using the displacement detector 20 with one LVDT. Thus, it is possible to achieve simplification of structure, reduction of production cost, and reduction in size of the device.

In addition, because the bearing 34 is the only moving component in the displacement detector 20, the number of moving parts is small (degree of freedom of motion being 1). As a result, occurrence of errors caused by the moving part can be reduced. Furthermore, because the displacement detector 20 according to the present embodiment has only one contactor, it is possible to improve the degree of freedom of attitude of the displacement detector 20 and measurement accuracy of displacement in each of the directions, compared to the invention disclosed in Patent Literature 1 provided with two contactors.

Figure 5:
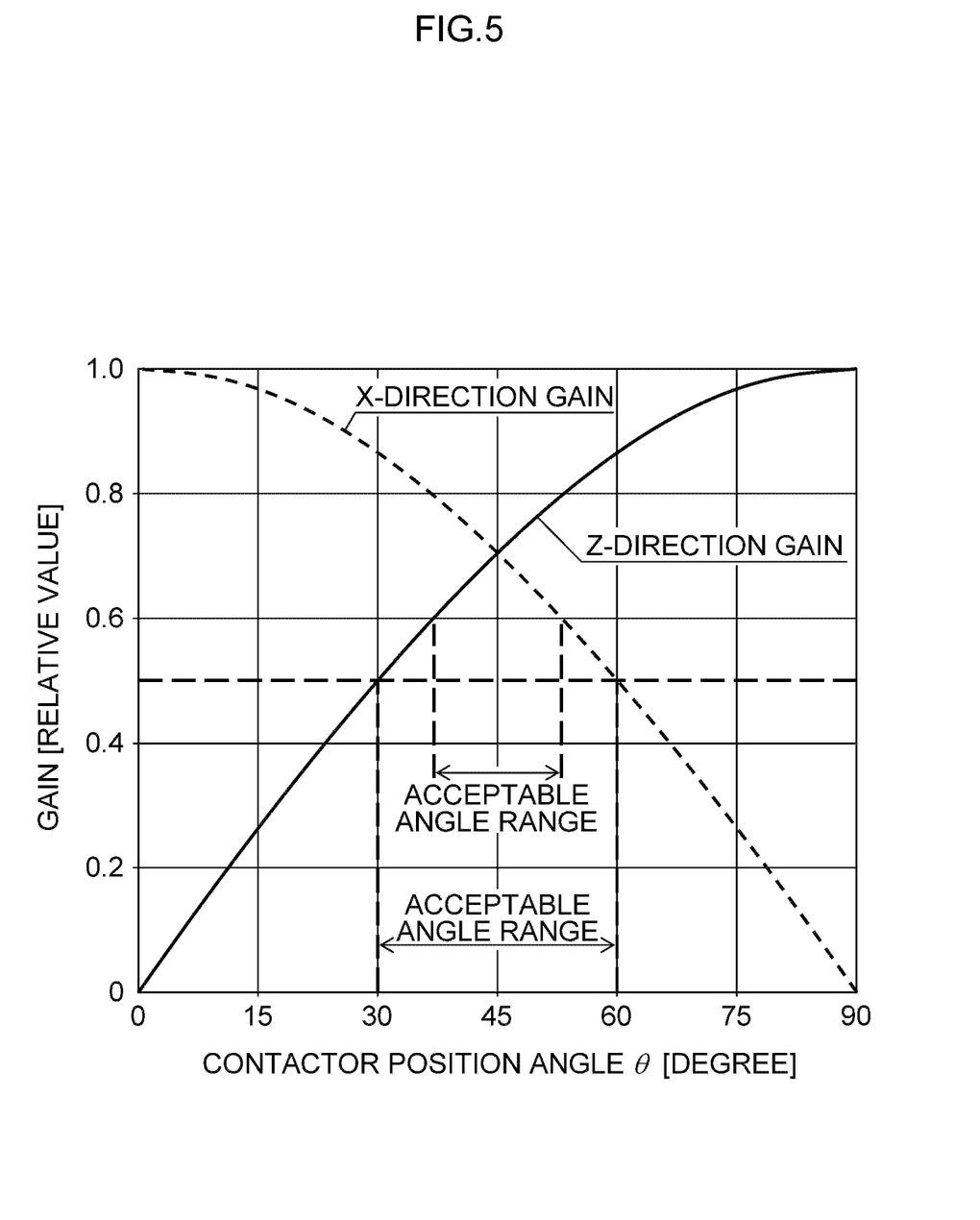
FIG. 5 is a graph showing a relationship between an inclination angle of a stylus and a gain of the displacement detector.

A preferred size of the inclination angle θ of the stylus 40 is explained hereinafter with reference to FIG. 5. FIG. 5 is a graph showing a relationship between the angle θ and a gain of the displacement detector 20, in which the abscissa represents the angle θ (unit: °), while the ordinate represents the measure of the gain. In FIG. 5, the dotted line represents the gain in the X-axis direction, while the solid line represents the gain in the Z-axis direction. The gain corresponds to the displacement amount of the contactor 44, and the gain is expressed in a relative value, with the maximum value being 1, in the graph of FIG. 5.

When there is a large difference between a percentage of the component in the X-axis direction and a percentage of the component in the Z-axis direction in the entire gain, the measurement sensitivity is largely different depending on the measurement direction, Given this, it is desirable that the measure of θ is defined such that the gain in the direction in which the measurement sensitivity is lower is no less than one-half of the maximum sensitivity (when the angle θ is 0°). In this case, as is obvious from FIG. 5, a ratio of the percentage of the component in the X-axis direction to the percentage of the component in the Z-axis direction falls within a range approximately from 1:0.58 to 1:1.73, and the angle θ falls within a range from 30° to 60°.

It is more preferable that the measure of the angle θ is defined such that the gain in the direction in which the measurement sensitivity is lower is no less than approximately 60% of the maximum sensitivity (when the angle θ is 0°). In this case, as is obvious from FIG. 5, a ratio of the percentage of the component in the X-axis direction to the percentage of the component in the Z-axis direction falls within a range approximately from 1:0.75 to 1:1.33, and the angle θ falls within a range approximately from 38° to 52°.

It is still more preferable that there is no difference in measurement sensitivity between the X-axis direction and the Z-axis direction. In FIG. 5, this corresponds to the angle θ in a case where the gain in the X-axis direction and the gain in the Z-axis direction intersect, that is, the angle θ is substantially 45°.

Next, calibration of the displacement detector 20 is explained. Calibration is performed, for example, before shipment of the surface shape measuring apparatus 10. Further, calibration may be performed after shipment as necessary, so as to appropriately update a calibration value. In the present embodiment, since the displacement detector 20 measures the displacement in two directions by means of one LVDT, calibration is performed for each of the two measurement directions.

First, for each of the X-axis direction and the Z-axis direction, data is obtained that demonstrates (shows) a correlative relationship between an actual displacement amount (known) and a signal quantity obtained by the displacement detecting unit 31. The data demonstrating the correlative relationship is exemplified by a calibration value table and a calibration curve. Subsequently, for each of the measurement directions, a gain with which a favorable signal quantity can be obtained is determined as a calibration value, based on the data demonstrating the correlative relationship.

Here, in a case in which the workpiece W has a hollow cylindrical shape or the like, another calibration value may also be determined for use in measurement of an inner peripheral lateral surface (inner peripheral direction). The calibration value thus determined is stored in, for example, memory (not illustrated) provided in the control unit 50. The type of the memory is not particularly limited, and is exemplified by ROM or RAM.

Note that the method for calibrating the LVDT is not largely different from the conventional one, and therefore detailed explanation thereof is omitted herein. Because the calibration value is set for each of the two measurement directions, the displacement detector 20 according to the present embodiment is capable of highly accurate measurement in both of the measurement directions.

Figure 6:
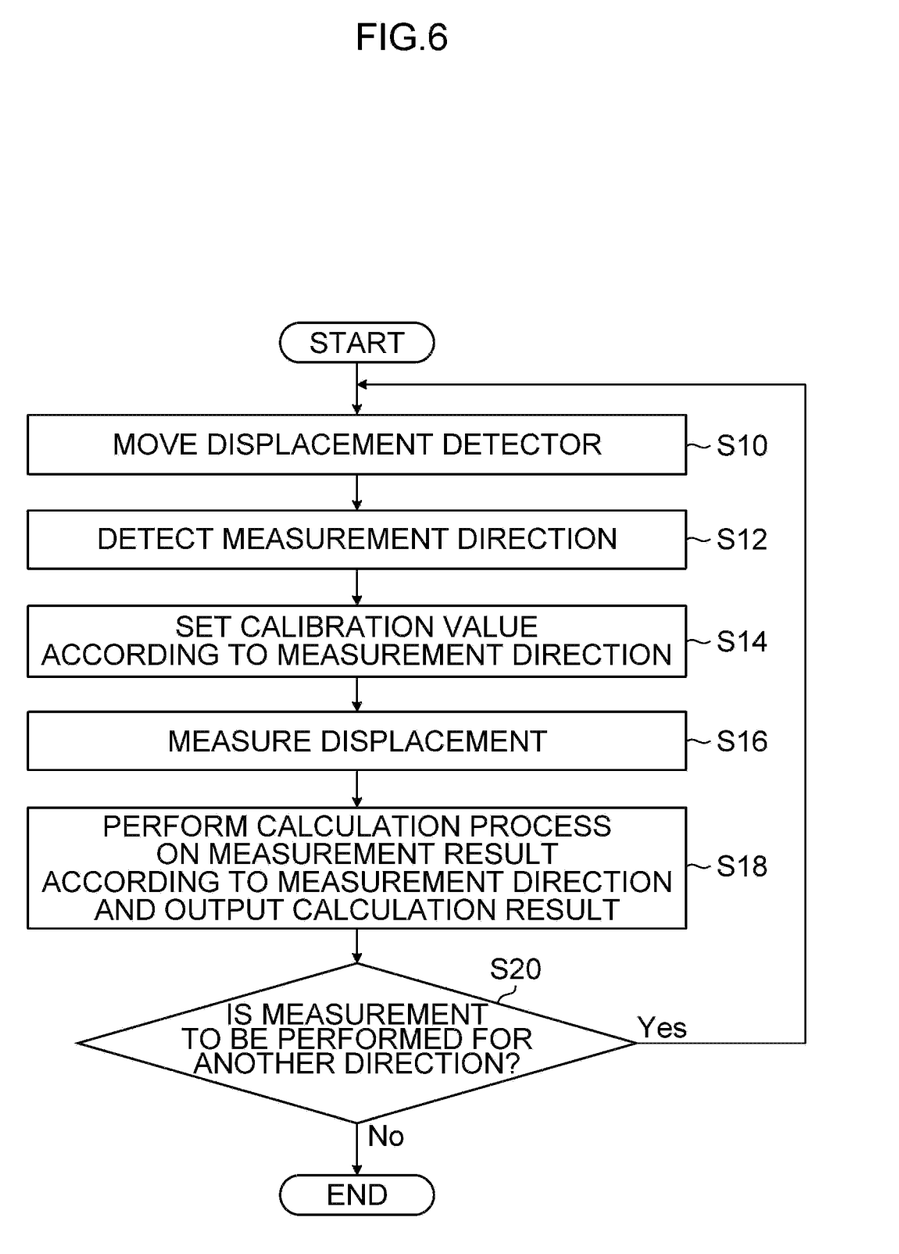
FIG. 6 is a flow chart showing a procedure of measurement using the surface shape measuring apparatus (roundness measuring apparatus).

A measurement procedure by using the surface shape measuring apparatus 10 according to the present embodiment is explained hereinafter with reference to FIG. 6. FIG. 6 is a flow chart showing the procedure of measurement. First, the control unit 50 moves the displacement detector 20 by means of the horizontal moving mechanism 12 and the perpendicular moving mechanism 14, to bring the contactor 44 into contact with the measuring surface of the workpiece W (step S10).

Subsequently, the control unit 50 automatically detects the measurement direction based on the driving directions of the horizontal moving mechanism 12 and the perpendicular moving mechanism 14 (step S12). The automatic detection of the measurement direction in the present embodiment is explained hereinafter with reference to FIGS. 2 to 4. The workpiece W having a hollow cylindrical shape is described as an example; however, it should not be construed as limiting the shape of the workpiece W.

In the case of measurement of roundness of the outer peripheral lateral face of the workpiece W, the control unit 50 drives the horizontal moving mechanism 12 in a negative direction along the X axis (horizontally leftward in FIG. 2) to bring the contactor 44 into contact with the outer peripheral lateral face of the workpiece W on the rotary table 16, as shown in FIG. 2. When the contactor 44 is in contact with the workpiece W, the displacement detecting unit 31 detects displacement of the contactor 44. Based on the detection of the displacement of the contactor 44 during driving of the horizontal moving mechanism 12 in the negative direction along the X axis, the control unit 50 automatically detects that measurement of displacement in the X-axis direction (outer diameter) is to be performed. Note that, also in the case of measuring straightness of the outer peripheral lateral face while moving the perpendicular moving mechanism 14 in the Z-axis direction in the state shown in FIG. 2, the measurement direction can be detected in a similar manner.

In the case of measurement of flatness of the top face of the workpiece W, the control unit 50 drives the perpendicular moving mechanism 14 in a negative direction along the Z axis (perpendicularly downward in FIG. 2) to bring the contactor 44 into contact with the top face of the workpiece W on the rotary table 16, as shown in FIG. 3. When the contactor 44 is in contact with the workpiece W, the displacement detecting unit 31 detects displacement of the contactor 44. Based on the detection of the displacement of the contactor 44 during driving of the perpendicular moving mechanism 14 in the negative direction along the Z axis, the control unit 50 automatically detects that measurement of displacement in the Z-axis direction is to be performed. Note that, also in the case of measuring straightness of the top face while moving the horizontal moving mechanism 12 in the X-axis direction in the state shown in FIG. 3, the measurement direction can be detected in a similar manner.

In the case of measurement of flatness of the inner lateral face of the workpiece W, the control unit 50 drives the horizontal moving mechanism 12 in a positive direction along the X axis (horizontally rightward in FIG. 4) to bring the contactor 44 into contact with the inner lateral face of the workpiece W on the rotary table 16, as shown in FIG. 4. When the contactor 44 is in contact with the workpiece W, the displacement detecting unit 31 detects displacement of the contactor 44. Based on the detection of the displacement of the contactor 44 during driving of the horizontal moving mechanism 12 in the positive direction along the X axis, the displacement detecting unit 31 automatically detects that measurement of displacement in the X-axis direction (internal diameter direction) is to be performed. Note that, also in the case of measuring straightness of the inner lateral face while moving the perpendicular moving mechanism 14 in the Z-axis direction in the state shown in FIG. 4, the measurement direction can be detected in a similar manner.

As described above, in the present embodiment, the measurement direction can be automatically detected based on which of the horizontal moving mechanism 12 and the perpendicular moving mechanism 14 is driven, and based on the direction in which the moving mechanism 12 or 14 is driven in a case where the contactor 44 is brought into contact with the workpiece W at the start of measurement. The efficiency of the measurement can thus be improved. Subsequently, the control unit 50 reads from the memory, the calibration value corresponding to the detected measurement direction and sets the calibration value (step S14), and measures the displacement of the contactor 44 (step S16).

For example, in the case of measuring roundness of the outer peripheral lateral face of the cylindrical workpiece W, displacement of the contactor 44 is measured with the displacement detecting unit 31 while the rotary table 16 (and the workpiece W) is rotated in the state shown in FIG. 2. For another example, in the case of measuring straightness of the outer peripheral lateral face of the workpiece W, displacement of the contactor 44 is measured with the displacement detecting unit 31 while the perpendicular moving mechanism 14 is driven to move the detector body 30 in the Z-axis direction in the state shown in FIG. 2.

For still another example, in the case of measuring flatness of the top face of the workpiece W, displacement of the contactor 44 is measured with the displacement detecting unit 31 while the rotary table 16 (and the workpiece W) is rotated in the state shown in FIG. 3. For yet another example, in the case of measuring straightness of the top face of the workpiece W, displacement of the contactor 44 is measured with the displacement detecting unit 31 while the horizontal moving mechanism 12 is driven to move the detector body 30 in the X-axis direction in the state shown in FIG. 3.

For further example, in the case of measuring roundness of the inner peripheral lateral face of the hollow cylindrical workpiece W, displacement of the contactor 44 is measured with the displacement detecting unit 31 while the rotary table 16 (and the workpiece W) is rotated in the state shown in FIG. 4. For still further example, in the case of measuring straightness of the inner peripheral lateral face of the workpiece W, displacement of the contactor 44 is measured with the displacement detecting unit 31 while the perpendicular moving mechanism 14 is driven to move the detector body 30 in the Z-axis direction in the state shown in FIG. 4.

In the present embodiment, since the displacement amount of the contactor 44 includes the X-axis direction component and the Z-axis direction component, the control unit 50 carries out calculation for converting the displacement amount of the contactor 44 measured by the displacement detecting unit 31 into a displacement amount in the measurement direction, and outputs the calculation result as the measurement result (step S18). Specifically, in the case of measuring the displacement in the X-axis direction (horizontal direction), the control unit 50 calculates the displacement amount in the X-axis direction by multiplying the displacement amount of the contactor 44 by cos θ, and outputs the result thus calculated as the measurement result. Meanwhile, in the case of measuring the displacement in the Z-axis direction (perpendicular direction), the control unit 50 calculates the displacement amount in the Z-axis direction by multiplying the displacement amount of the contactor 44 by sin θ, and outputs the result thus calculated as the measurement result.

If measurement is to be performed for another direction after step S18 (step S20: Yes), the procedure returns to step S10. As explained in the foregoing, there is no need for changing the attitude of the displacement detector 20 when changing the measurement direction in the present embodiment, and thus the measurement can be performed efficiently. If no measurement is to be performed for another direction (step S20: No), the measurement terminates.

Thus, according to the present embodiment, the stylus 40 swingable in the X-Z plane around the bearing 34 as the swing center (center of the swinging movement) is used. Since the line connecting the center of the contactor 44 with the rotational axis of the stylus 40 forms the predetermined angle θ with respect to the vertical line, the direction from the swing center of the stylus 40 toward the contactor 44 (contactor direction) includes the X-axis direction component and the Z-axis direction component. Since the contactor 44 is displaced in the direction perpendicular to the direction from the rotational axis of swing toward the contactor 44, the displacement of the contactor 44 also includes the X-axis direction component and the Z-axis direction component. Therefore, it is possible to measure the displacement in the X-axis direction and the Z-axis direction by means of the displacement detector 20 including one LVDT.

Thus, it is possible to simplify the configuration and reduce the production cost of the displacement detector 20. In addition, because the displacement detector 20 according to the present embodiment has the small number of moving parts, it is possible to lower likelihood of error occurrence.

Second Embodiment

Figure 7:
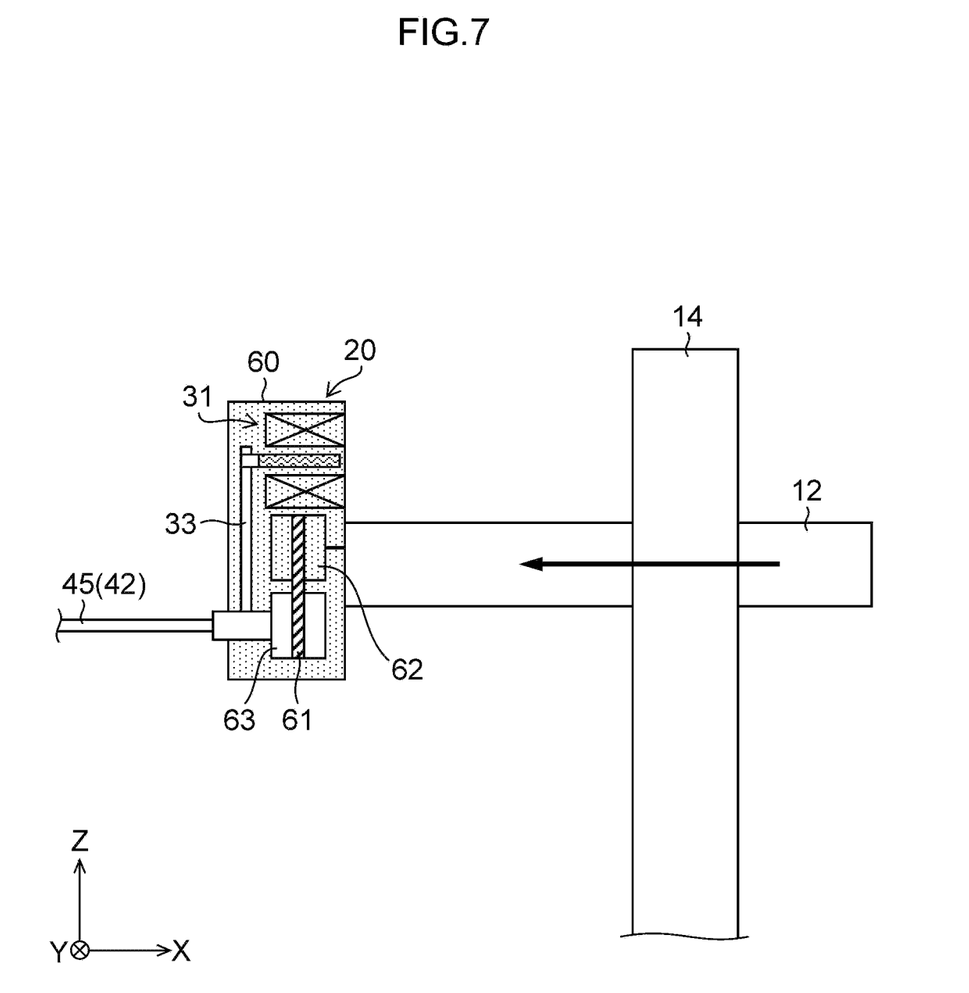
FIG. 7 shows an example of a configuration of a displacement detector according to a second embodiment.

In the second embodiment described hereinafter, the configuration of the displacement detector is different from that of the first embodiment. Specifically, in the second embodiment, the displacement detector includes an elastic body in place of the bearing 34. An overall configuration of the surface shape measuring apparatus according to the second embodiment is essentially the same as that of the first embodiment, and therefore description thereof is omitted. FIG. 7 shows a configuration of a displacement detector 60 according to the second embodiment.

In FIG. 7, the displacement detector 60 includes a leaf spring 61 as an example of the elastic body. As shown in FIG. 7, one end of the leaf spring 61 is held by the spring holding member 62, and the spring holding member 62 is fixed to the fixing part, for example the detector body 30. The other end of the leaf spring 61 is held by the spring holding member 63, and spring holding member 63 is connected to the stylus holding part 33.

In FIG. 7, immovable parts in the configuration of the displacement detector 60 are dot-shaded (dot-hatched), for the sake of distinction from the moving parts. In the second embodiment, the stylus 40 is configured to be swingable around a substantial center of the leaf spring 61 (center of a portion not held by the spring holding members 62 and 63) (swing center). When the position of the contactor 44 at the leading end of the stylus 40 is displaced during measurement, the displacement is transmitted to the core of the displacement detecting unit 31 via the stylus arm 42 and the stylus holding part 33, and the displacement detecting unit 31 detects the displacement.

Note that the spring holding member 63 is movable while the spring holding member 62 is immovable. Therefore, when the position of the contactor 44 is displaced to displace (deform) the leaf spring 61 from the neutral position, the leaf spring 61 generates a reaction force. The reaction force acts in a direction opposite to the displacement direction of the contactor 44, and thus the reaction force acts to press the contactor 44 against the measuring surface. Since the reaction force plays a role of the measurement force generated by the measurement force applying mechanism 32 in the first embodiment, the need for the measurement force applying mechanism 32 can be eliminated in the second embodiment. Further simplification of the configuration of the displacement detector 60 is thus enabled.

Third Embodiment

Similarly to the second embodiment, in the third embodiment as well, the displacement detector includes an elastic body in place of the bearing 34. An overall configuration of the surface shape measuring apparatus according to the third embodiment is essentially the same as that of the first embodiment, and therefore description thereof is omitted.

Figure 8:
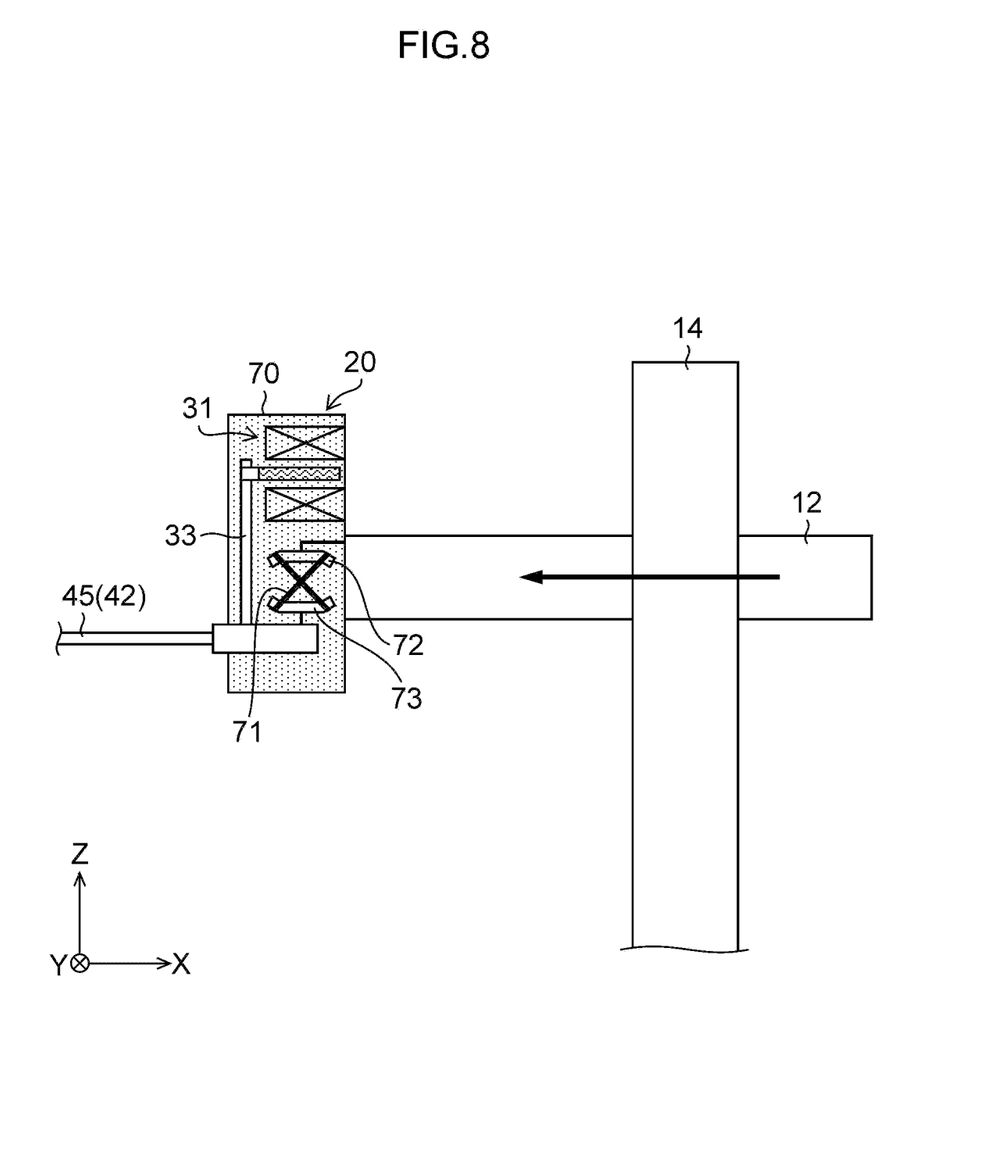
FIG. 8 shows an example of a configuration of a displacement detector according to a third embodiment.

FIG. 8 shows a configuration of a displacement detector 70 according to the third embodiment.

In FIG. 8, the displacement detector 70 includes a cross-shaped spring 71 as an example of the elastic body. As shown in FIG. 8, two ends among four ends of the cross-shaped spring 71 are held by the spring holding member 72, and the spring holding part 72 is fixed to the fixing part, for example, the detector body 30. Remaining two ends among the four ends of the cross-shaped spring 71 are held by the spring holding member 73, and the spring holding part 73 is connected to the stylus holding part 33.

In FIG. 8, immovable parts in the configuration of the displacement detector 70 are dot-shaded (dot-hatched), for the sake of distinction from the moving parts. In the third embodiment, the stylus 40 is configured to be swingable around a center of the cross-shaped spring 71 (intersecting point of the cross shape) (as a swing center). When the position of the contactor 44 of the stylus 40 is displaced during measurement, the displacement is transmitted to the core of the displacement detecting unit 31 via the stylus arm 42 and the stylus holding part 33, thus enabling the displacement detecting unit 31 to detect the displacement.

Note that the spring holding member 73 is movable while the spring holding member 72 is immovable. When the position of the contactor 44 is displaced to displace the cross-shaped spring 71 from the neutral position, the cross-shaped spring 71 generates a reaction force. Similarly to the second embodiment, in the third embodiment as well, since the reaction force plays a role of the measurement force generated by the measurement force applying mechanism 32 in the first embodiment, the need for the measurement force applying mechanism 32 can be eliminated.

Fourth Embodiment

Figure 9:
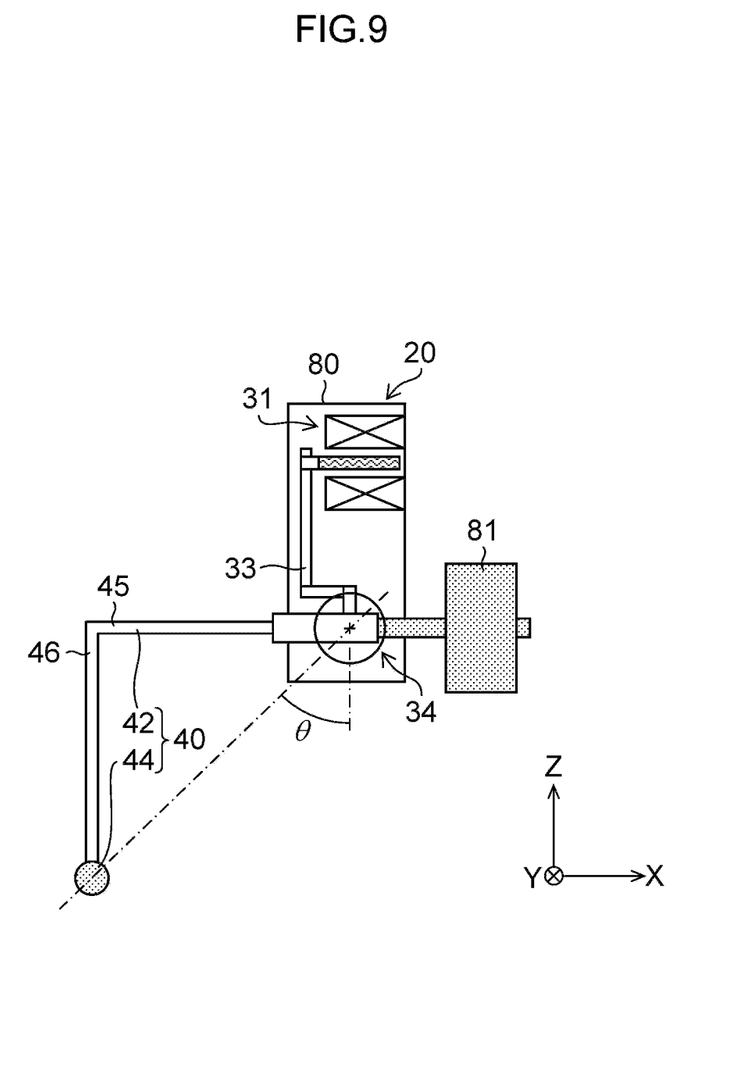
FIG. 9 shows an example of a configuration of a displacement detector according to a fourth embodiment.

In the fourth embodiment, the displacement detector includes a counter weight in place of the measurement force applying mechanism 32. An overall configuration of the surface shape measuring apparatus according to the fourth embodiment is essentially the same as that of the first embodiment, and therefore description thereof is omitted. FIG. 9 shows a configuration of a displacement detector 80 according to the fourth embodiment.

As shown in FIG. 9, the displacement detector 80 includes a counter weight 81 on an opposite side to the stylus 40 seen from the bearing 34. For example, when the stylus 40 swings around the bearing 34, the counter weight 81 swings in a direction opposite to the swing direction of the stylus 40. Thus, the need for the measurement force applying mechanism 32 in the first embodiment can be eliminated.

<Effects>

As set forth in the foregoing, because the displacement detectors 20, 60, 70, and 80 according to the embodiments each having only one displacement detecting unit 31, it is possible to measure displacement in two directions with simpler configuration. Thus, it is possible to reduce the production cost of the displacement detectors 20, 60, 70, and 80.

Because the number of moving parts (low degree of freedom of motion) of the displacement detectors 20, 60, 70, and 80 is reduced, it is possible to suppress occurrence of errors caused by the moving parts. In addition, because the calibration value is set for each of the measurement directions, it is possible to measure in all of the measurement directions enables with high accuracy.

Since it is possible to automatically detect the measurement direction based on the moving direction of the driving mechanisms (the horizontal moving mechanism 12 and the perpendicular moving mechanism 14) at the start of measurement, measurement efficiency can be improved.

The embodiments of the present invention have been described above; however, it is obvious that the present invention is not limited to the aforementioned examples and various improvements and modifications may be made without departing from the scope of the present invention.

REFERENCE SIGNS LIST

10 . . . surface shape measuring apparatus, 12 . . . horizontal moving mechanism, 14 . . . perpendicular moving mechanism, 16 . . . rotary table, 20, 60, 70, 80 . . . displacement detector, 30 . . . detector body, 31 . . . displacement detecting unit, 32 . . . measurement force applying mechanism, 33 . . . stylus holding part, 34 . . . bearing, 40 . . . stylus, 42 . . . stylus arm, 44 . . . contactor, 45 . . . horizontal arm portion, 46 . . . perpendicular arm portion, 50 . . . control unit, 61 . . . leaf spring, 62, 63, 72, 73 . . . spring holding member, 71 . . . cross-shaped spring, W . . . workpiece

What is claimed is:

1. A displacement detector comprising:
   a detector body;
   a stylus having a contactor configured to be brought into contact with a measuring surface of an object to be measured;
   a stylus holding part provided in the detector body and configured to hold the stylus that is capable of being swung along a swing plane including a first direction and a second direction that are perpendicular to each other; and
   a displacement detecting unit provided in the detector body and configured to detect displacement of the contactor in association with contact between the contactor and the measuring surface, wherein
   the stylus comprises:
   a first arm which has a first one end portion and a first another end portion, and extends in the first direction from the first one end portion toward the first another end portion, the first one end portion being held by the stylus holding part; and
   a second arm which has a second one end portion and a second another end portion and extends in the second direction from the second one end portion toward the second another end portion, the second one end portion being connected to the first another end portion and the second another end portion being provided with the contactor, and
   the displacement detecting unit is capable of detecting displacement in the first direction and displacement in the second direction as the displacement of the contactor without a change in attitude of the detector body, based on a displacement amount of the contactor and an angle formed between a line connecting a center of the contacting element with a rotational axis of the stylus, and a vertical line.

2. The displacement detector according to claim 1, wherein the stylus holding part is attached to the detector body via an elastic body in a swingable manner.

3. The displacement detector according to claim 1, wherein, when the contactor is displaced, the displacement detecting unit can detect displacement in the first direction and displacement in the second direction, as the displacement of the contactor.

4. The displacement detector according to claim 1, wherein the displacement detecting unit has a calibration value for each of the first direction and the second direction.

5. The displacement detector according to claim 1, wherein:
the displacement detecting unit comprises a differential transformer having a core and a plurality of coils; and
the stylus holding part supports the core at an end portion on a side opposite to a side on which the stylus is supported, seen from the swing center.

6. The displacement detector according to claim 1, wherein the stylus is pivotally supported via the stylus holding part to be swingable around the rotational axis perpendicular to the swing plane.

7. The displacement detector according to claim 6, comprising
a measurement force applying part configured to apply a force biasing the contactor in a direction toward the measuring surface.

8. The displacement detector according to claim 1, wherein, assuming that a contactor direction is a direction from a swing center of the stylus toward the contactor, the contactor direction includes a component in the first direction and a component in the second direction.

9. The displacement detector according to claim 8, wherein, in a state in which the contactor is not in contact with the measuring surface, a ratio of the component in the first direction to the component in the second direction falls within a range from 1:0.58 to 1:1.73.

10. The displacement detector according to claim 8, wherein, in a state in which the contactor is not in contact with the measuring surface, a ratio of the component in the first direction to the component in the second direction falls within a range from 1:0.75 to 1:1.33.

11. The displacement detector according to claim 8, wherein, in a state in which the contactor is not in contact with the measuring surface, the component in the first direction is equal to the component in the second direction.

12. A surface shape measuring apparatus comprising:
the displacement detector according to claim 1; and
a moving mechanism configured to hold the displacement detector and move the displacement detector relatively to the object to be measured in a horizontal direction and a perpendicular direction perpendicular to the horizontal direction.

13. The surface shape measuring apparatus according to claim 12, further comprising
a control unit configured to detect a measurement direction of the displacement detector based on a moving direction of the moving mechanism when the contactor of the displacement detector is brought into contact with the object to be measured at start of measurement.

14. The surface shape measuring apparatus according to claim 13, wherein the control unit detects the measurement direction of the displacement detector based on a signal that controls driving of the moving mechanism.

15. A roundness measuring apparatus comprising:
the displacement detector according to claim 1; and
a rotary stage configured to rotate the object to be measured around a stage rotational axis that is parallel to the perpendicular direction.

16. The roundness measuring apparatus according to claim 15, further comprising:
a moving mechanism configured to hold the displacement detector and move the displacement detector relatively to the object to be measured in a horizontal direction and a perpendicular direction perpendicular to the horizontal direction; and
a control unit configured to detect a measurement direction of the displacement detector based on a moving direction of the moving mechanism when the contactor of the displacement detector is brought into contact with the object to be measured at start of measurement.

17. The roundness measuring apparatus according to claim 16, wherein the control unit detects the measurement direction of the displacement detector based on a signal that controls driving of the moving mechanism.

18. A displacement detector comprising:
a detector body;
a stylus having a contactor to be in contact with a measuring surface of an object to be measured;
a stylus holding part that is provided in the detector body and holds the stylus that is capable of being swung; and
a displacement detecting unit that is provided in the detector body and detects displacement of the contactor associated with contact between the contactor and the measuring surface,
wherein:
the stylus has a first arm and a second arm that are perpendicular to each other; and
the displacement detecting unit is capable of detecting displacement in a longitudinal direction of the first arm and displacement in a longitudinal direction of the second arm as the displacement of the contactor without a change in attitude of the detector body, based on a displacement amount of the contactor and an angle formed between a line connecting a center of the contactor with a rotational axis of the stylus, and a vertical line.

* * * * *